(12) United States Patent
Medina

(10) Patent No.: US 10,625,872 B2
(45) Date of Patent: Apr. 21, 2020

(54) COMPOSITE FAN COWL HAVING CORE WITH VARYING THICKNESS

(71) Applicant: The Boeing Company, Chicago, IL (US)

(72) Inventor: Juan Camilo Medina, Charleston, SC (US)

(73) Assignee: The Boeing Company, Chicago, IL (US)

( * ) Notice: Subject to any disclaimer, the term of this patent is extended or adjusted under 35 U.S.C. 154(b) by 587 days.

(21) Appl. No.: 15/369,256

(22) Filed: Dec. 5, 2016

(65) Prior Publication Data

US 2018/0155043 A1 Jun. 7, 2018

(51) Int. Cl.
*B64D 29/08* (2006.01)
*B64C 1/14* (2006.01)
*F01D 25/26* (2006.01)

(52) U.S. Cl.
CPC ............... *B64D 29/08* (2013.01); *B64C 1/14* (2013.01); *F01D 25/265* (2013.01); *F05D 2240/14* (2013.01)

(58) Field of Classification Search
CPC ... B64C 1/14; B64C 2001/0072; B64D 29/06; B64D 29/08; F01D 25/265; F01D 25/28; F02D 2240/14
See application file for complete search history.

(56) References Cited

U.S. PATENT DOCUMENTS 6,375,121 B1 * 4/2002 Porte ..................... B29C 70/30
244/129.4

* cited by examiner

*Primary Examiner* — Jacob M Amick
(74) *Attorney, Agent, or Firm* — Yee & Associates, P.C.

(57) ABSTRACT

An engine nacelle comprised of an inlet, an exhaust end, and a composite fan cowl. The composite fan cowl has a core with a thickness varying in a direction moving from the inlet to the exhaust end.

20 Claims, 8 Drawing Sheets

COMPOSITE FAN COWL HAVING CORE WITH VARYING THICKNESS

BACKGROUND INFORMATION

1. Field

The present disclosure relates generally to composite fan cowls, and more specifically to composite fan cowls with a reduced weight. Yet more specifically, the present disclosure includes a composite fan cowl having a core with varying thickness.

2. Background

In vehicles, increased weight decreases fuel efficiency of the vehicles. In aircraft, additional weight of the vehicle replaces potential payload such as customers, equipment, or other goods. Increased weight also increases the fuel costs of operating aircraft. Decreasing the weight of components used on the vehicles may be desirable to increase the payload for the vehicles or decrease fuel costs.

An engine nacelle is a housing connected to an aircraft and covering an engine of the aircraft. Air enters through an inlet of the nacelle, travels through the nacelle and exits through the exhaust. Fan cowls form part of the body of the nacelle.

The fan cowls are associated with hinges and latches to facilitate movement of the fan cowls for maintenance. The latches secure the fan cowls in a closed position. When the latches are released, the fan cowls pivot relative to the rest of the nacelle using the hinges.

While a fan cowl is in an open position, it is subject to environmental forces. Gusts of wind striking an open fan cowl will apply a load to the fan cowl, causing the fan cowl to deform. It is desirable to control the deformation of the fan cowl due to wind gusts. Specifically, it is undesirable for the fan cowl to strike other components of the nacelle or other structures due to deformation. Further, it is undesirable for the fan cowl to permanently deform due to wind gusts.

It would be desirable to have a method and apparatus that takes into account at least some of the issues discussed above, including reducing aircraft weight while controlling fan cowl deformation, as well as other possible issues.

SUMMARY

In one illustrative embodiment, a composite fan cowl is provided. The composite fan cowl comprises laminate skins and a core. The core has a plurality of zones having a plurality of core thicknesses. The plurality of zones includes a hinge zone, a latch zone, and a zone between the hinge zone and the latch zone having a lower thickness than both of a thickness of the hinge zone and a thickness of the latch zone.

In another illustrative embodiment, a composite fan cowl is provided. The composite fan cowl comprises a core with a plurality of zones each having a respective thickness. The plurality of zones includes a first edge zone associated with the leading edge of the core, a second edge zone associated with the trailing edge of the core, and a lower zone between the first edge zone and the second edge zone. A thickness of the lower zone is less than a thickness of each of the first edge zone and the second edge zone.

In yet another illustrative embodiment, an engine nacelle is provided. The engine nacelle comprises an inlet, an exhaust, and a composite fan cowl. The composite fan cowl has a core with a thickness varying in a direction moving from the inlet to the exhaust.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that weight of an aircraft may be reduced by reducing the weight of an engine nacelle. More specifically, the illustrative embodiments recognize and take into account that the weight of an engine nacelle may be reduced by reducing the weight of the composite fan cowls.

Additionally, the illustrative embodiments recognize and take into account that a composite fan cowl is a composite panel. The illustrative embodiments recognize and take into account that a composite panel may be considered a composite sandwich panel when the composite panel is comprised of a core layer of material that is sandwiched between a first layer of material and a second layer of material. The core layer of material may have a greater thickness than the first and second layers of material. The core layer of material may be hollow or have a gas contained within the core material. In some cases, the core layer of material may be comprised of a honeycomb material, a foam material, or some other suitable type of structure. A honeycomb material may be a material that has a honeycomb-like structure.

The illustrative embodiments also recognize and take into account that the core may be tailored to reduce the weight of the composite fan cowl. More specifically, the illustrative embodiments recognize and take into account that portions of the core may have a reduced thickness to reduce the weight of the composite fan cowl without undesirably increasing the deformation of the composite fan cowl. More specifically, the illustrative embodiments recognize and take into account that areas of higher thicknesses may provide stiffened areas of the core. Yet more specifically, the illustrative embodiments recognize and take into account that portions of the core having lower bending moments may have a reduced thickness.

Figure 1:
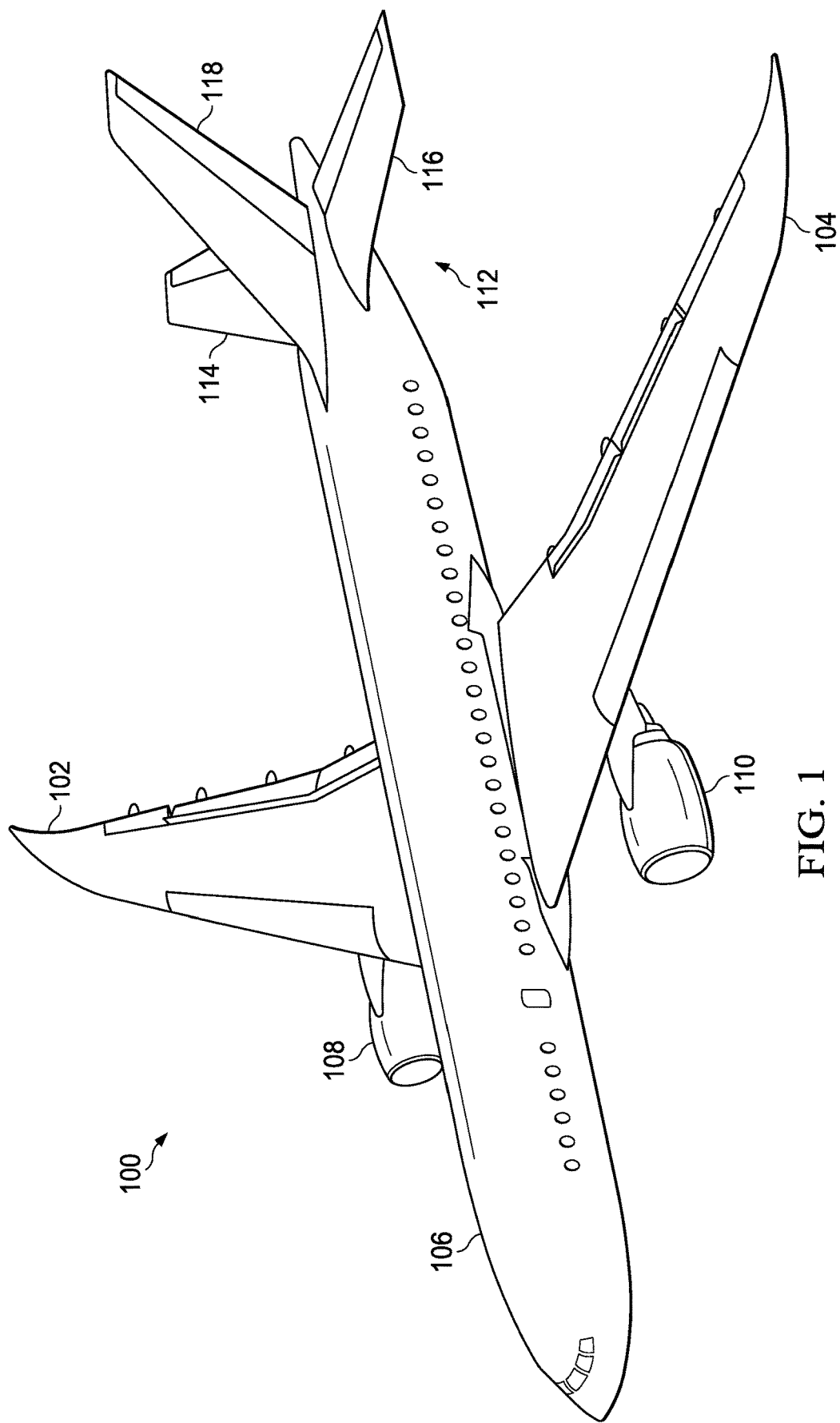
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of an aircraft having a composite fan cowl with a core having varying thickness. For example, at least one of engine 108 or engine 110 may have a composite fan cowl with a core having varying thickness as described herein.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Figure 2:
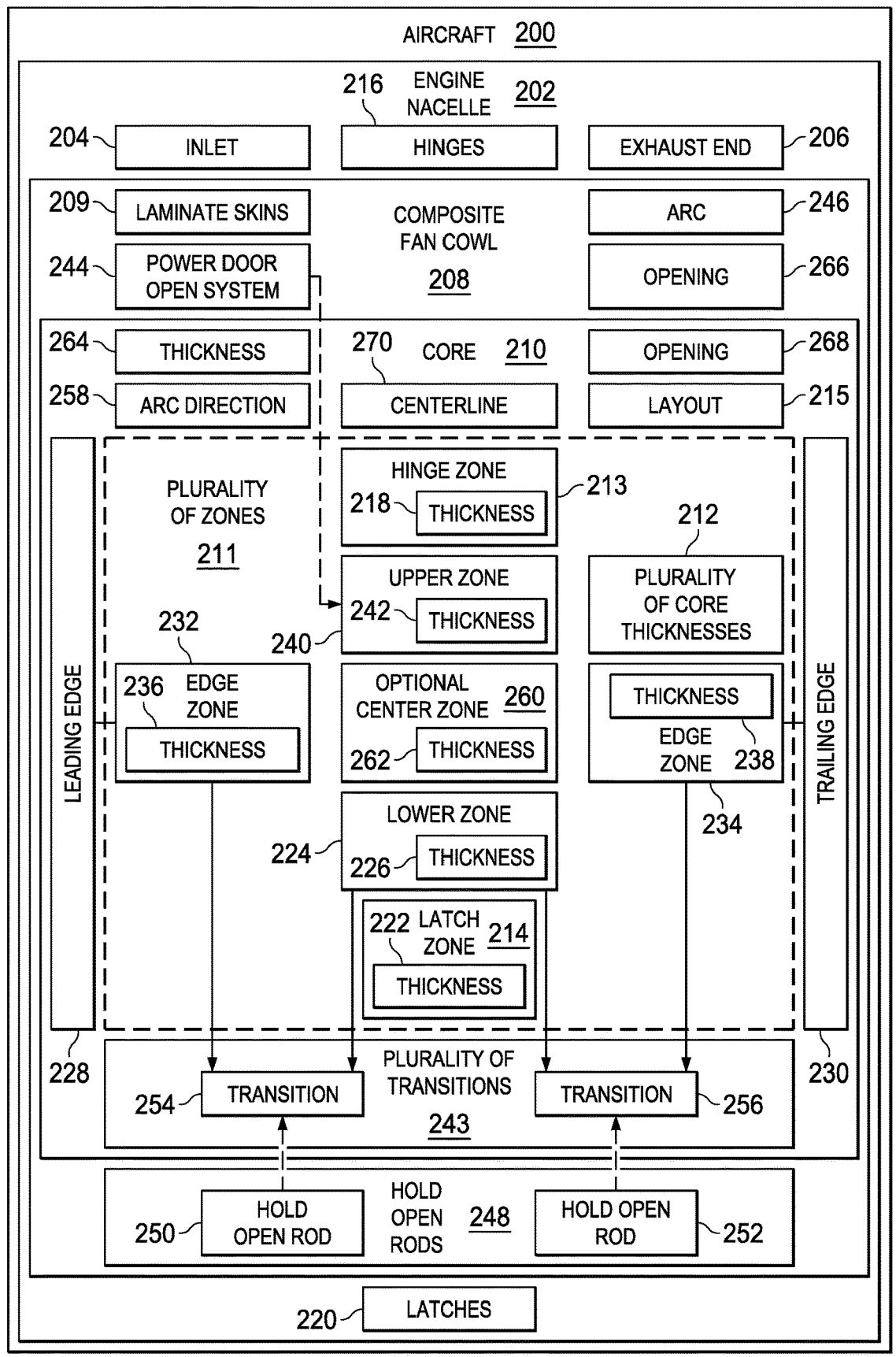
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 100 of FIG. 1 may be a physical implementation of aircraft 200.

Aircraft 200 has engine nacelle 202. Engine nacelle 202 has inlet 204, exhaust end 206, and composite fan cowl 208. Composite fan cowl 208 comprises laminate skins 209 and core 210. Laminate skins 209 are formed of any desirable material and have any desirable number of plies. A number of plies of each of laminate skins 209 is independent of the plurality of core thicknesses of core 210.

Core 210 is formed of any desirable material. In some illustrative examples, core 210 is a honeycomb core. In other illustrative examples, core 210 may be formed of a foam. In yet other illustrative examples, core 210 may be formed of another lightweight, high strength material.

Core 210 has plurality of zones 211 having plurality of core thicknesses 212. Plurality of core thicknesses 212 is selected to reduce the weight of core 210 while maintaining performance of composite fan cowl 208.

Plurality of core thicknesses 212 is selected based on a bending moment of composite fan cowl 208 when subjected to wind gusts loading when composite fan cowl 208 is in an open position. Plurality of core thicknesses 212 is selected such that a measure of deformation of composite fan cowl 208 due to wind gusts is substantially the same as a measure of deformation of a conventional composite fan cowl. Plurality of core thicknesses 212 may be selected such that a measure of deformation of composite fan cowl 208 due to wind gusts is maintained or reduced.

Plurality of zones 211 includes hinge zone 213 and latch zone 214. Layout 215 of plurality of zones 211 of core 210 may be based on a simulation. In some illustrative examples, layout 215 may be based on a topography optimization. The results of a topography optimization may be reviewed, and layout 215 formed, taking into account ease of manufacturing, space constraints within composite fan cowl 208, or any other desirable factors.

Hinges 216 of engine nacelle 202 connect to composite fan cowl 208 in hinge zone 213. Hinge zone 213 has thickness 218. Thickness 218 is selected based on performance characteristics for core 210. In some illustrative examples, thickness 218 may be the same as a thickness for a hinge zone of a conventional composite fan cowl.

Latches 220 of engine nacelle 202 connect to composite fan cowl 208 in latch zone 214. Latch zone 214 has thickness 222. Thickness 222 is selected based on performance characteristics for core 210. In some illustrative examples, thickness 222 may be the same as a thickness for a latch zone of a conventional composite fan cowl.

Core 210 also has a zone between hinge zone 213 and latch zone 214 having a lower thickness than both of thickness 218 of hinge zone 213 and thickness 222 of latch zone 214. For example, plurality of zones 211 includes lower zone 224 having thickness 226 less than both thickness 218 of hinge zone 213 and thickness 222 of latch zone 214. In some illustrative examples, an area of core 210 outside of hinge zone 213 and the latch zone 214 has plurality of core thicknesses 212 from leading edge 228 of core 210 to trailing edge 230 of core 210.

In some illustrative examples, plurality of zones 211 includes edge zones associated with leading edge 228 of core 210 and trailing edge 230 of core 210. As depicted, the edge zones include edge zone 232 associated with leading edge 228 and edge zone 234 associated with trailing edge 230.

In some illustrative examples, the edge zones have greater respective core thicknesses than the zone between hinge zone 213 and latch zone 214. In core 210, edge zone 232 has thickness 236 and edge zone 234 has thickness 238. Thickness 236 and thickness 238 are greater than thickness 226 of lower zone 224.

In some illustrative examples, plurality of zones 211 further comprises upper zone 240 between the number of edge zones, hinge zone 213, and lower zone 224, and wherein upper zone 240 and lower zone 224 have different respective core thicknesses. Upper zone 240 has thickness 242. In some illustrative examples, thickness 242 is greater than thickness 226 of lower zone 224.

Core 210 further includes plurality of transitions 243 between plurality of zones 211. Each of plurality of transitions 243 is a region of core 210 between two zones of plurality of zones 211 having different thicknesses. Plurality of transitions 243 comprises a plurality of ramp downs.

Power door open system (PDOS) 244 is associated with composite fan cowl 208. Power door open system (PDOS) 244 actuates movement of composite fan cowl 208 relative to the remainder of engine nacelle 202. Power door open system (PDOS) 244 is associated with core 210 within upper zone 240. When power door open system (PDOS) 244 is associated with upper zone 240, thickness 242 may provide support and stiffness for power door open system (PDOS) 244 of engine nacelle 202. Upper zone 240 is above lower zone 224 along arc 246 of composite fan cowl 208.

After moving composite fan cowl 208 using power door open system (PDOS) 244, composite fan cowl 208 is held open using hold open rods 248. Hold open rods 248 include hold open rod (HOR) 250 and hold open rod (HOR) 252. Hold open rods 248 are associated with two transitions of plurality of transitions 243.

As depicted, hold open rod (HOR) 250 is associated with transition 254 of plurality of transitions 243. Transition 254 is between edge zone 232 and lower zone 224. Transition 254 is an area of core 210 changing between thickness 236 and thickness 226. Hold open rod (HOR) 252 is associated with transition 256 of plurality of transitions 243. Transition 256 is between edge zone 234 and lower zone 224. Transition 256 is an area of core 210 changing between thickness 238 and thickness 226. Core 210 has a first transition, transition 254, ramping down from a thickness of leading edge 228 to thickness 226 of lower zone 224 and a second transition, transition 256, ramping up from thickness 226 of lower zone 224 to a thickness of trailing edge 230.

In some illustrative examples, the zone between hinge zone 213 and the latch zone 214 is a first zone, wherein a second zone of plurality of zones 211 is positioned between the two hold open rods 248, wherein a third zone of plurality of zones 211 is above the second zone in arc-direction 258 and the first zone of plurality of zones 211 is below the second zone in arc-direction 258, and wherein a thickness of the second zone is greater than the respective thicknesses of the third zone and the first zone. Lower zone 224 is the first zone. The second zone is optional center zone 260. Upper zone 240 is the third zone.

When optional center zone 260 is present, optional center zone 260 has thickness 262. Optional center zone 260 may be positioned within another zone of plurality of zones 211. For example, optional center zone 260 may be positioned within lower zone 224. In this example, thickness 262 may be greater than or less than thickness 226. When thickness 262 is greater than thickness 226, optional center zone 260 provides selective support and stiffening. When thickness 262 is less than thickness 226, optional center zone 260 reduces the weight of core 210.

In some illustrative examples, composite fan cowl 208 has core 210 with thickness 264 varying in a direction moving from inlet 204 to exhaust end 206. In these illustrative examples, leading edge 228 of core 210 associated with inlet 204, and trailing edge 230 of core 210 associated with exhaust end 206, each have a greater thickness than lower zone 224 between leading edge 228 and trailing edge 230.

In some illustrative examples, plurality of zones 211 includes a zone between the hinge zone and the latch zone having a lower thickness than both of a thickness of the hinge zone and a thickness of the latch zone.

The illustration of composite fan cowl 208 of aircraft 200 in FIG. 2 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, although not explicitly shown, transitions may be present between each set of zones of plurality of zones 211 having different thicknesses. For example, plurality of transitions 243 may further comprise a transition between hinge zone 213 and upper zone 240. As another example, plurality of transitions 243 may further comprise a transition between upper zone 240 and lower zone 224. Yet further, plurality of transitions 243 may further comprise a transition between lower zone 224 and latch zone 214.

As another example, composite fan cowl 208 may or may not include opening 266. When composite fan cowl 208 includes opening 266, core 210 has opening 268 that forms a part of opening 266. In some illustrative examples, when opening 268 is present in core 210, the edges of opening 268 may have a different thickness from the surrounding zone. For example, when opening 268 is present in upper zone 240, the edges of opening 268 may have a greater thickness than thickness 242. In some illustrative examples, the edges of opening 268 may be considered transitions of plurality of transitions 243.

Further, in some illustrative examples, core 210 may have centerline 270 in arc-direction 258. When topography optimization is used, symmetry about centerline 270 may be a constraint for the topography optimization.

FIG. 2 includes a non-limiting description of a core of a composite fan cowl, core 210 of composite fan cowl 208, in accordance with an illustrative embodiment. FIG. 2 is not a limiting example of components of engine nacelle 202. For example, engine nacelle 202 may have other functional components such as thrust reversers, pylons, struts, exhaust cones, or other components not discussed herein.

Figure 3:
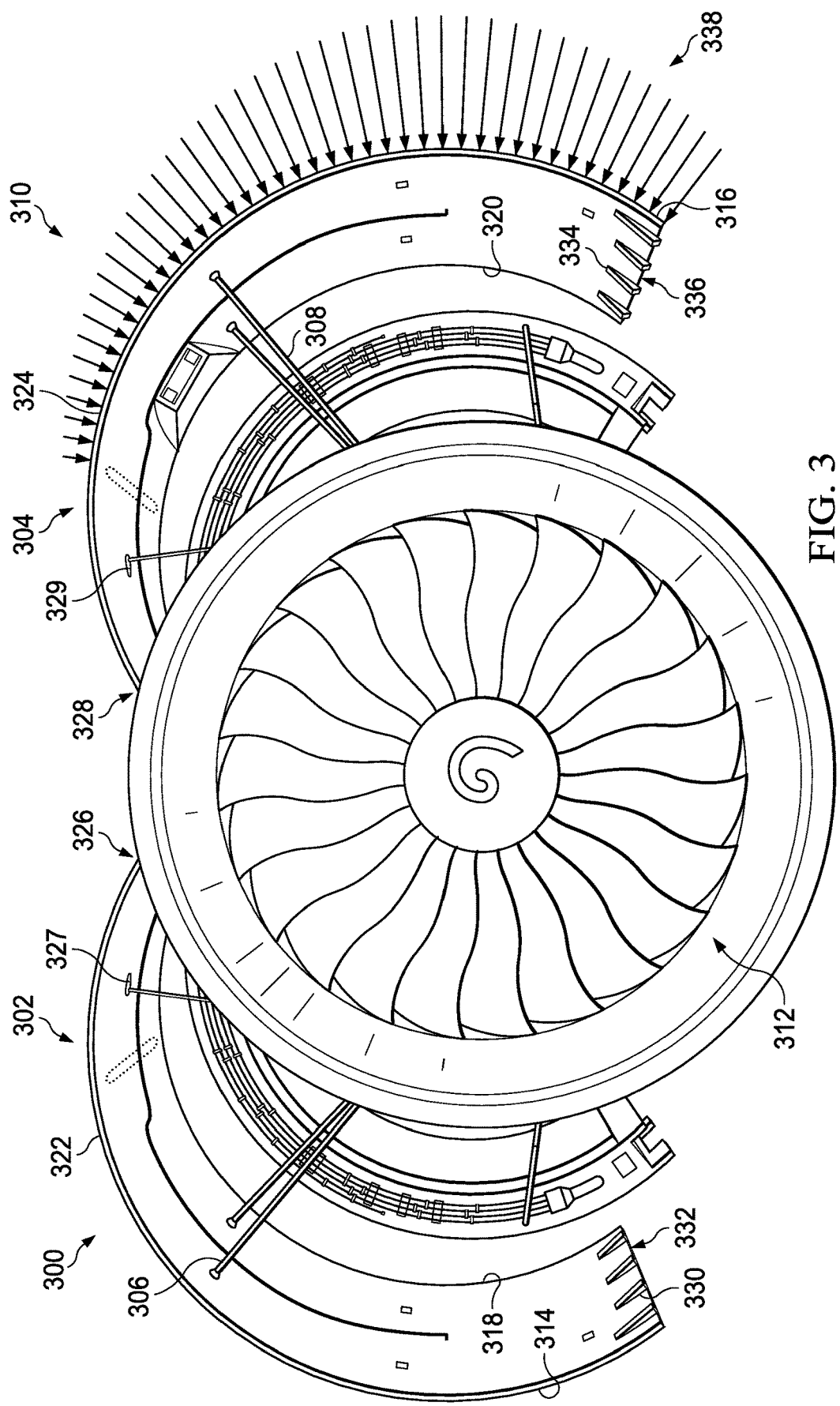
FIG. 3 is an illustration of an engine nacelle in an open position with a force diagram overlaid on a fan cowl in accordance with an illustrative embodiment.

Turning now to FIG. 3, an illustration of an engine nacelle in an open position with a force diagram overlaid on a fan cowl is depicted in accordance with an illustrative embodiment. Engine nacelle 300 may be a physical implementation of engine nacelle 202 of FIG. 2.

Engine nacelle 300 is depicted in an open position. Engine nacelle 300 has composite fan cowl 302 and composite fan cowl 304. At least one of composite fan cowl 302 or composite fan cowl 304 may be a physical implementation of composite fan cowl 208 of FIG. 2.

Both composite fan cowl 302 and composite fan cowl 304 are held in an open position. Composite fan cowl 302 is held open by hold open rods (HOR) 306. Composite fan cowl 304 is held open by hold open rods (HOR) 308.

View 310 of engine nacelle 300 is a front view of engine nacelle 300. Inlet 312 of engine nacelle 300 is visible in view 310. Air will flow into the page, entering engine nacelle 300 at inlet 312 and exiting engine nacelle 300 at an exhaust end (not depicted) of engine nacelle 300 opposite inlet 312. Air exiting through the exhaust end of engine nacelle 300 may travel through an exhaust from the engine or through a thrust reverser.

Composite fan cowl 302 has leading edge 314 that is positioned near inlet 312. Composite fan cowl 304 has leading edge 316 that is positioned near inlet 312. Composite fan cowl 302 has trailing edge 318 positioned near the exhaust end (not depicted) of engine nacelle 300. Composite fan cowl 304 has trailing edge 320 positioned near the exhaust end (not depicted) of engine nacelle 300.

Composite fan cowl 302 has arc 322. Composite fan cowl 304 has arc 324. Composite fan cowl 302 swings up using hinges at first end 326 of arc 322. Movement of composite fan cowl 302 may be powered by power door open system (PDOS) 327. Composite fan cowl 304 swings up using hinges at first end 328 of arc 324. Movement of composite fan cowl 304 may be powered by power door open system (PDOS) 329.

After closing composite fan cowl 302, composite fan cowl 302 is secured using latches 330 at second end 332 of arc 322. After closing composite fan cowl 304, composite fan cowl 304 is secured using latches 334 at second end 336 of arc 324. First end 326 and second end 332 are opposing ends of arc 322. First end 328 and second end 336 are opposing ends of arc 324.

View 310 of engine nacelle 300 includes exemplary forces 338. Exemplary forces 338 depict a force distribution on composite fan cowl 304 due to a gust of wind. More specifically, exemplary forces 338 is a force distribution on composite fan cowl 304 for a gust of wind near hold open rods 308.

Figure 4:
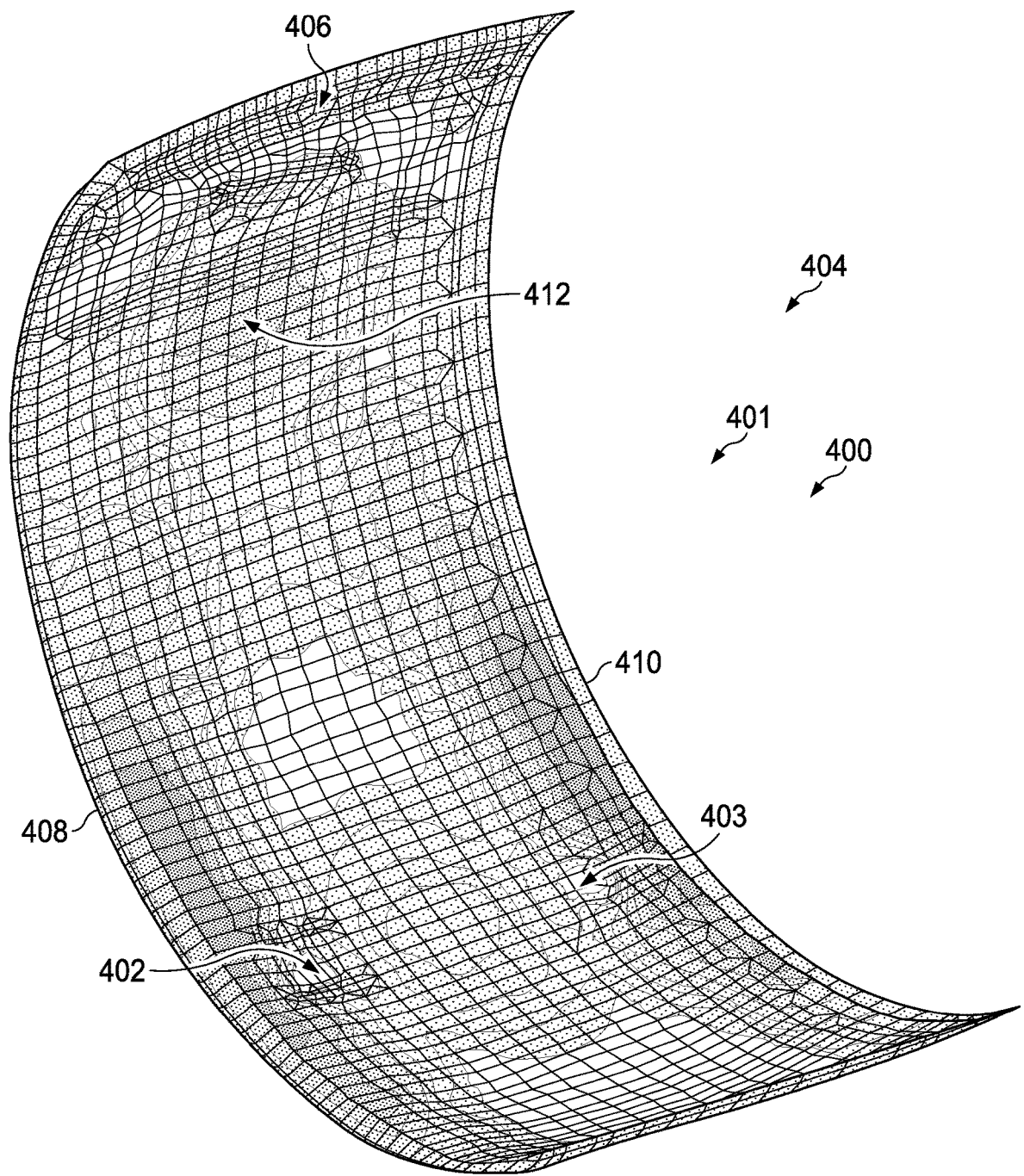
FIG. 4 is an illustration of topography of a core of a composite fan cowl in accordance with an illustrative embodiment.

Turning now to FIG. 4, an illustration of topography of a core of a composite fan cowl is depicted in accordance with an illustrative embodiment. Core 400 is a three-dimensional model of a core of a composite fan cowl, such as core 210 of composite fan cowl 208 of FIG. 2 with illustrated topography.

Core 400 has plurality of regions 401. Each of plurality of regions 401 has a variable thickness. The thickness for each zone of plurality of regions 401 is moved independently of each other zone of plurality of zones. The thickness of each zone of plurality of regions 401 is varied based on an estimated load on the respective zone. The simulated loads applied to generate core 400 include any desirable types or intensity of loads. The simulated loads may include at least one of loads from wind gust conditions, loads from extreme operating conditions of associated hinges and latches, loads from aerodynamic conditions, or any other loads that may be imposed on the composite fan cowl.

Core 400 may be created using topography optimization. Topography optimization is a class of shape optimization. In topography optimization, the nodes of final elements in a model are independently moved along a prescribed direction within some allowed bounds. In this example, topography optimization is employed on composite sandwich panel structures to determine a desirable core thickness.

Core 400 is an illustration of topography for a core of a composite fan cowl created based on a load applied to area 402 and area 403. Area 402 and area 403 are areas associated with hold open rods (HOR) of a composite fan cowl.

Design variables and constraints for the analysis are set prior to altering topography of core 400. Design variables include limits to the thickness for each region of plurality of regions 401. The thickness limits include at least one of a maximum thickness or a minimum thickness. The thickness limits may be set considering at least one of manufacturing constraints, ease of manufacturing, ease of assembly, or any other types of variables. For example, manufacturing equipment may limit the maximum thickness for core 400. As another example, for ease of assembly, the minimum thickness may be greater than zero.

Constraints for the analysis may include desirable conditions for resulting core 400. In one illustrative example, the constraints include symmetry in the fore-aft direction of the composite fan cowl. In another illustrative example, the constraints include symmetry between the two composite fan cowls of the engine nacelle. In yet another illustrative example, the constraints include a maximum deflection for the composite fan cowl.

In view 404, the imposed maximum thickness is three inches. For core 400 in view 404, the simulation is subject to loads from wind gust conditions held by either the hold open rods (HOR) or power door open system (PDOS). For core 400 in view 404, the simulation includes symmetry imposed in the fore-aft direction. Additionally, for core 400 in view 404, hinge zone 406 is not adjusted. The thickness for hinge zone 406 is set independent of the topography optimization.

Core 400 is an illustration of a simulation result. Core 400 is used to create a physical core for a composite fan cowl. Core 400 may be used as a basis for a design for a physical implementation of a core for a composite fan cowl. Plurality of zones 211 of FIG. 2 may be formed based on core 400. Further, plurality of core thicknesses 212 of plurality of zones 211 may be selected based on the thicknesses of plurality of regions 401.

In core 400, the intensity of the shading for a respective region of plurality of regions 401 depicts the thickness for the respective region of plurality of regions 401. The greater the intensity of the shading, the thicker the region.

As depicted, core height is increased proportional to the bending moment. Thus, the topography optimizing reduces bending deflection which is the main deflection mode by increasing core thickness. By increasing core thickness, the moment of inertia is increased in the areas of the maximum bending moment.

In core 400, the greatest intensities are located at edge 408 and edge 410. Area 412 has an increased intensity relative to surrounding regions. A layout for a core based on core 400 may have zones of greater thickness near edge 408, edge 410, and area 412.

Figure 5:
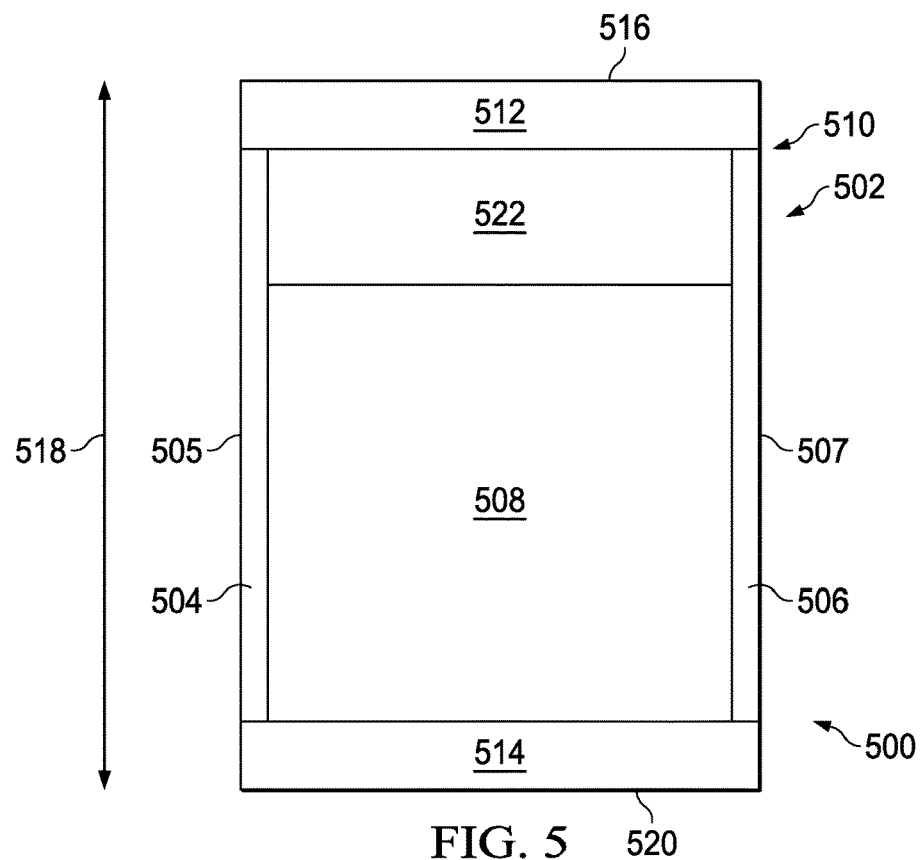
FIG. 5 is an illustration of a first layout for a core of a composite fan cowl in accordance with an illustrative embodiment.

Turning now to FIG. 5, an illustration of a first layout for a core of a composite fan cowl is depicted in accordance with an illustrative embodiment. Core 500 is an example of a layout of core 210 of composite fan cowl 208 of FIG. 2. Core 500 is an example of a layout of a core for one of composite fan cowl 302 or composite fan cowl 304 of FIG. 3. Core 500 is a layout for creating a physical core for a composite fan cowl. A physical core may be created based on the design of core 500.

Core 500 has plurality of zones 502 each having a respective thickness. Plurality of zones 502 includes first edge zone 504, second edge zone 506, and lower zone 508. First edge zone 504 is associated with a leading edge of a composite fan cowl, such as leading edge 314 of composite fan cowl 302 of FIG. 3. First edge zone 504 includes a portion of leading edge 505 of core 500.

Second edge zone 506 is associated with a trailing edge of the composite fan cowl, such as trailing edge 318 of composite fan cowl 302 of FIG. 3. Second edge zone 506 includes a portion of trailing edge 507 of core 500. As depicted, first edge zone 504 and second edge zone 506 have a substantially similar length. Each of first edge zone 504 and second edge zone 506 is depicted as rectangular. However, first edge zone 504 and second edge zone 506 may have any desirable size, shape, or thickness.

Lower zone 508 is between first edge zone 504 and second edge zone 506, wherein a thickness of lower zone 508 is less than a thickness of each of first edge zone 504 and second edge zone 506. Although lower zone 508 is depicted as rectangular, lower zone 508 may have any desirable size, shape, or thickness.

In some illustrative examples, first edge zone 504 and second edge zone 506 have the same thickness. In other illustrative examples, first edge zone 504 has a greater thickness than second edge zone 506.

Core 500 also has plurality of transitions 510. Each transition of plurality of transitions 510 is an area gradually reducing or increasing thickness between zones of different thicknesses. Plurality of transitions 510 is not explicitly identified on core 500. Instead, each transition of plurality of transitions 510 occupies space between the respective zones of plurality of zones 502.

Plurality of zones 502 also includes hinge zone 512 and latch zone 514. Hinge zone 512 is on first end 516 of arc-direction 518. Latch zone 514 is on second end 520 of arc-direction 518. Hinges of the composite fan cowl are associated with hinge zone 512 of core 500. Latches of the composite fan cowl are associated with latch zone 514 of core 500.

Core 500 further comprises upper zone 522 having a greater thickness (not depicted) than lower zone 508. Upper zone 522 is above lower zone 508 along an arc of the composite fan cowl. As depicted, upper zone 522 is surrounded by hinge zone 512, lower zone 508, first edge zone 504, and second edge zone 506. However, upper zone 522 may have any desirable size, shape, or thickness.

Plurality of zones 502 may have any desirable respective thicknesses. In some illustrative examples, the thicknesses (not depicted) for hinge zone 512 and latch zone 514 are selected based on performance parameters. In some illustrative examples, the thicknesses for hinge zone 512 and latch zone 514 are unchanged from a conventional core design.

In some illustrative examples, the thicknesses for each of hinge zone 512 and latch zone 514 are greater than at least one of upper zone 522 or lower zone 508. In other illustrative examples, the thickness (not depicted) of upper zone 522 is greater than or equal to a thickness of at least one of hinge zone 512 or latch zone 514.

In some illustrative examples, the respective thicknesses for plurality of zones 502 are each within the range of half an inch to two and a half inches. In some illustrative examples, a greatest thickness for plurality of zones 502 is three inches. At least one of a minimum or a maximum thickness for plurality of zones 502 may be set based on manufacturing constraints.

The size and shape of each of plurality of zones 502 may be modified based on at least one of ease of manufacturing, space constraints within the composite fan cowl, or a change in estimated load for a topography model such as core 400 in FIG. 4.

Figure 6:
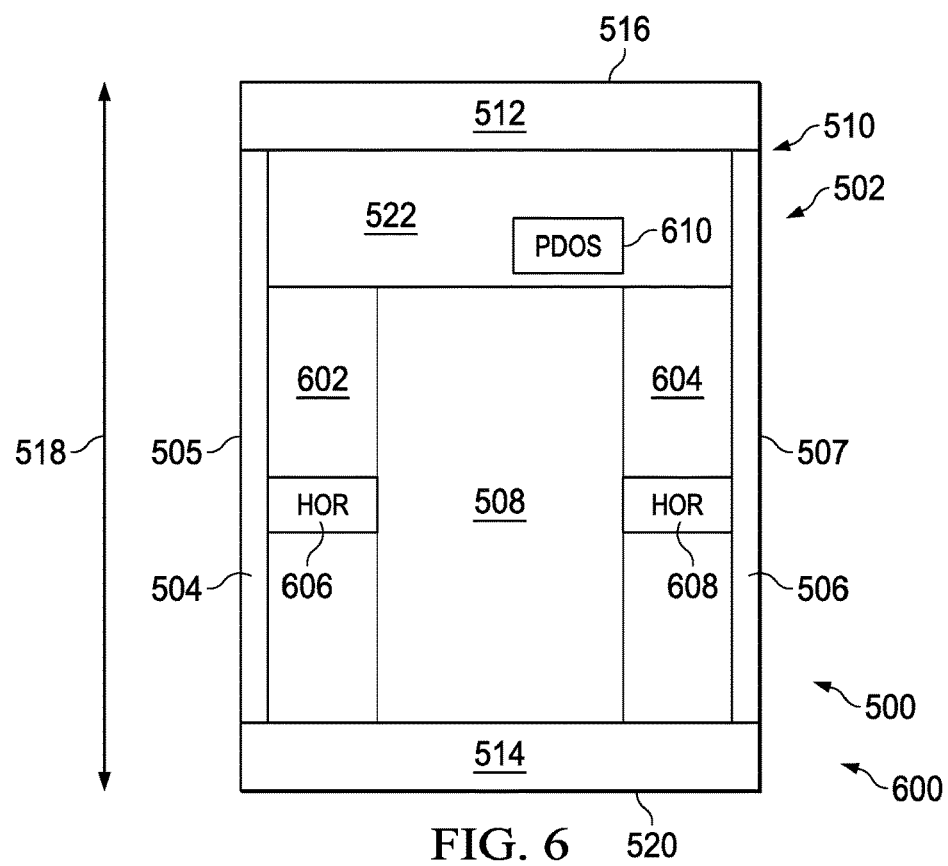
FIG. 6 is an illustration of a second layout for a core of a composite fan cowl in accordance with an illustrative embodiment.

Turning now to FIG. 6, an illustration of a layout for a core of a composite fan cowl is depicted in accordance with an illustrative embodiment. View 600 is a view of core 500 with two identified transitions. View 600 also identifies locations for other components of the engine nacelle.

Plurality of transitions 510 includes first transition 602 between first edge zone 504 and lower zone 508, and second transition 604 between second edge zone 506 and lower zone 508. In some illustrative examples, first transition 602 is a ramp down greater than 35 degrees. In some illustrative examples, second transition 604 is a ramp down greater than 35 degrees.

As depicted, a hold open rod (HOR) is associated with first transition 602 and a second hold open rod (HOR) is associated with second transition 604. More specifically, area 606 of core 500 encompasses a footprint of a hold open rod (HOR) bracket that will connect a hold open rod (HOR), such as one of hold open rods (HOR) 306 of FIG. 3, to the composite fan cowl having core 500. Area 608 of core 500 encompasses a footprint of a second hold open rod bracket (HOR) that will connect a second hold open rod (HOR), such as the other of hold open rods (HOR) 306 of FIG. 3, to the composite fan cowl having core 500.

First transition 602 provides support and stiffening to area 606. Second transition 604 provides support and stiffening to area 608.

As depicted, a power door open system (PDOS) is associated with upper zone 522. More specifically, area 610 of core 500 is connected to a power door open system (PDOS), such as power door open system (PDOS) 327 of FIG. 3. As depicted, upper zone 522 encompasses area 610 to provide support and stiffening to area 610. Upper zone 522 has a greater thickness than lower zone 508. In some illustrative examples, upper zone 522 may have substantially the same thickness as hinge zone 512. In other illustrative examples, a thickness of upper zone 522 may be less than hinge zone 512.

Figure 7:
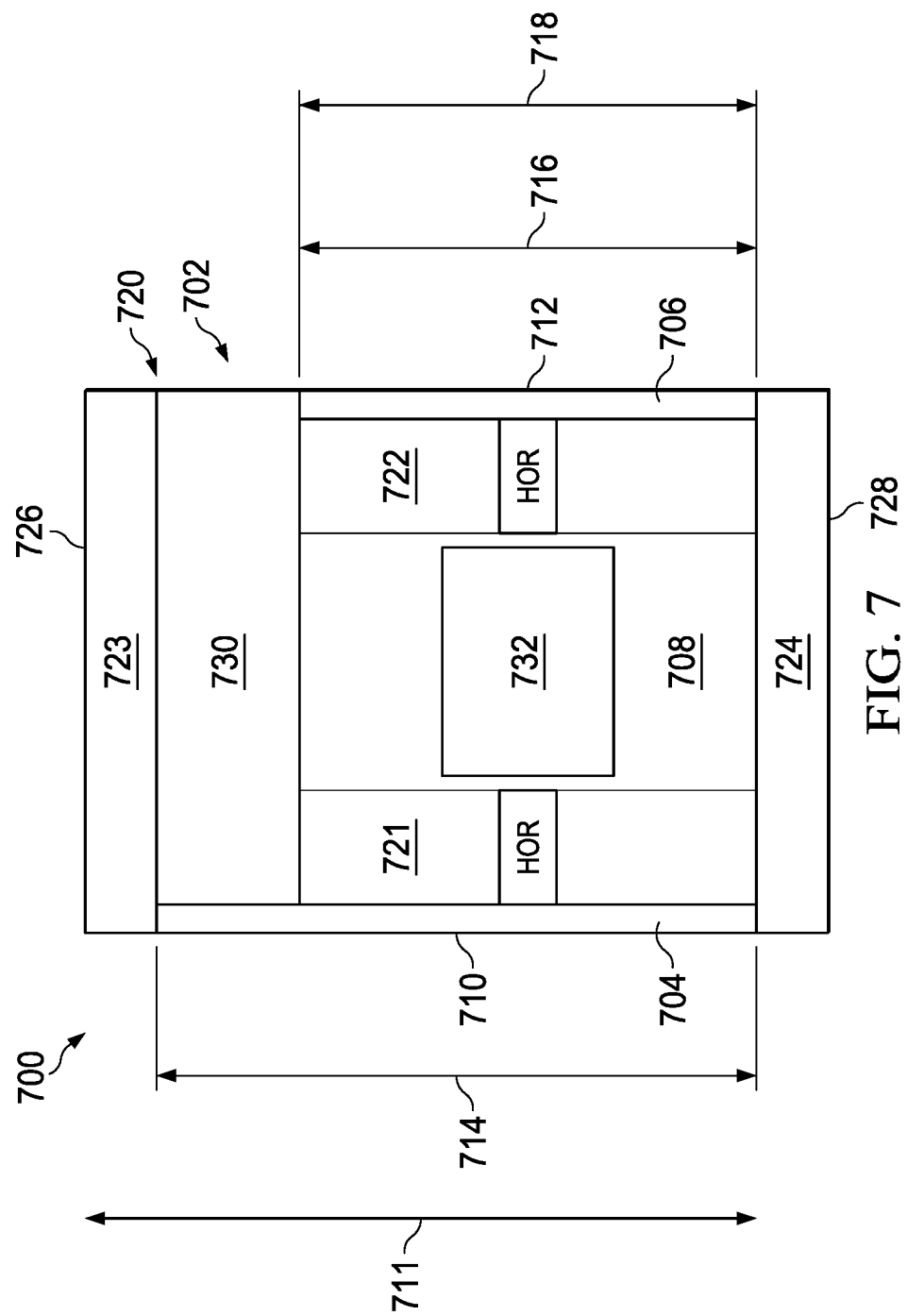
FIG. 7 is an illustration of a third layout for a core of a composite fan cowl in accordance with an illustrative embodiment.

Turning now to FIG. 7, an illustration of a third layout for a core of a composite fan cowl is depicted in accordance with an illustrative embodiment. Core 700 is an example of a layout of core 210 of composite fan cowl 208 of FIG. 2. Core 700 is an example of a layout of a core for one of composite fan cowl 302 or composite fan cowl 304 of FIG. 3. Core 700 is a layout for creating a physical core for a composite fan cowl. A physical core may be created based on the design of core 700.

Core 700 has plurality of zones 702, each having a respective thickness. Plurality of zones 702 includes first edge zone 704, second edge zone 706, and lower zone 708. First edge zone 704 is associated with a leading edge of a composite fan cowl, such as leading edge 314 of composite fan cowl 302 of FIG. 3. First edge zone 704 includes a portion of leading edge 710 of core 700.

Second edge zone 706 is associated with a trailing edge of the composite fan cowl, such as trailing edge 318 of composite fan cowl 302 of FIG. 3. Second edge zone 706 includes a portion of trailing edge 712 of core 700. As depicted, length 714 of the portion of leading edge 710 covered by first edge zone 704 in arc-direction 711 is greater than length 716 of the portion of trailing edge 712 covered by second edge zone 706 in arc-direction 711.

In some illustrative examples, first edge zone 704 and second edge zone 706 have the same thickness. In other illustrative examples, first edge zone 704 has a greater thickness than second edge zone 706.

Lower zone 708 is between first edge zone 704 and second edge zone 706, wherein a thickness of lower zone 708 is less than a thickness of each of first edge zone 704 and second edge zone 706. As depicted, length 718 of lower zone 708 in arc-direction 711 is substantially the same as length 716.

Core 700 also has plurality of transitions 720. Each transition of plurality of transitions 720 is an area gradually reducing or increasing thickness between zones of different thicknesses. Each of plurality of transitions 720 is not explicitly identified on core 700. Each transition of plurality of transitions 720 occupies space between the respective zones of plurality of zones 702. Two transitions, transition 721 and transition 722, are depicted in core 700.

Transition 721 is between first edge zone 704 and lower zone 708 and transition 722 is between second edge zone 706 and lower zone 708. As depicted, a hold open rod (HOR) is associated with transition 721 and a second hold open rod (HOR) is associated with transition 722. Similar to first transition 602 and second transition 604 shown in FIG. 6, transition 721 and transition 722 provide support and stiffening to areas connected to the hold open rods (HOR).

Plurality of zones 702 also includes hinge zone 723 and latch zone 724. Hinge zone 723 is on first end 726 of arc-direction 711. Latch zone 724 is on second end 728 of arc-direction 711. Hinges of the composite fan cowl are associated with hinge zone 723 of core 700. Latches of the composite fan cowl are associated with latch zone 724 of core 700.

Core 700 further comprises upper zone 730 having a greater thickness than lower zone 708. Upper zone 730 is above lower zone 708 along an arc of the composite fan cowl. Upper zone 730 has a different size than upper zone 522 of FIG. 5. In core 700, upper zone 730 covers a portion of trailing edge 712.

Core 700 further comprises center zone 732. Center zone 732 may be an implementation of optional center zone 260 of FIG. 2. In some illustrative examples, a thickness of center zone 732 is less than the thickness of lower zone 708. The presence of center zone 732, having a reduced thickness, may reduce the weight of a core of a composite fan cowl, such as composite fan cowl 302 of FIG. 3. In other illustrative examples, a thickness of center zone 732 is greater than the thickness of lower zone 708. When center zone 732 has a greater thickness than lower zone 708, center zone 732 may provide localized stiffening.

Plurality of zones 702 may have any desirable respective thicknesses. In some illustrative examples, the thicknesses for hinge zone 723 and latch zone 724 are selected based on performance parameters. In some illustrative examples, the thicknesses for hinge zone 723 and latch zone 724 are unchanged from a conventional core design.

In some illustrative examples, the thicknesses for each of hinge zone 723 and latch zone 724 are greater than at least one of upper zone 730, center zone 732, or lower zone 708. In other illustrative examples, the thickness of upper zone 730 is greater than or equal to a thickness of at least one of hinge zone 723 or latch zone 724.

Although not depicted in FIG. 7, a power door open system (PDOS) may be associated with upper zone 730. In illustrative examples in which a power door open system (PDOS) is associated with upper zone 730, the thickness of upper zone 730 may be selected to provide support to the power door open system (PDOS). In illustrative examples in which a power door open system (PDOS) is associated with upper zone 730, the thickness of upper zone 730 may be selected to reduce deformation influenced by the position of power door open system (PDOS).

In some illustrative examples, the respective thicknesses for plurality of zones 702 are each within the range of half an inch to two and a half inches. In some illustrative examples, a greatest thickness for plurality of zones 702 is three inches. At least one of a minimum or a maximum thickness for plurality of zones 702 may be set based on manufacturing constraints.

The size and shape of each of plurality of zones 702 may be modified based on at least one of ease of manufacturing, space constraints within the composite fan cowl, or a change in estimated load for a topography model such as core 400 of FIG. 4.

Figure 8:
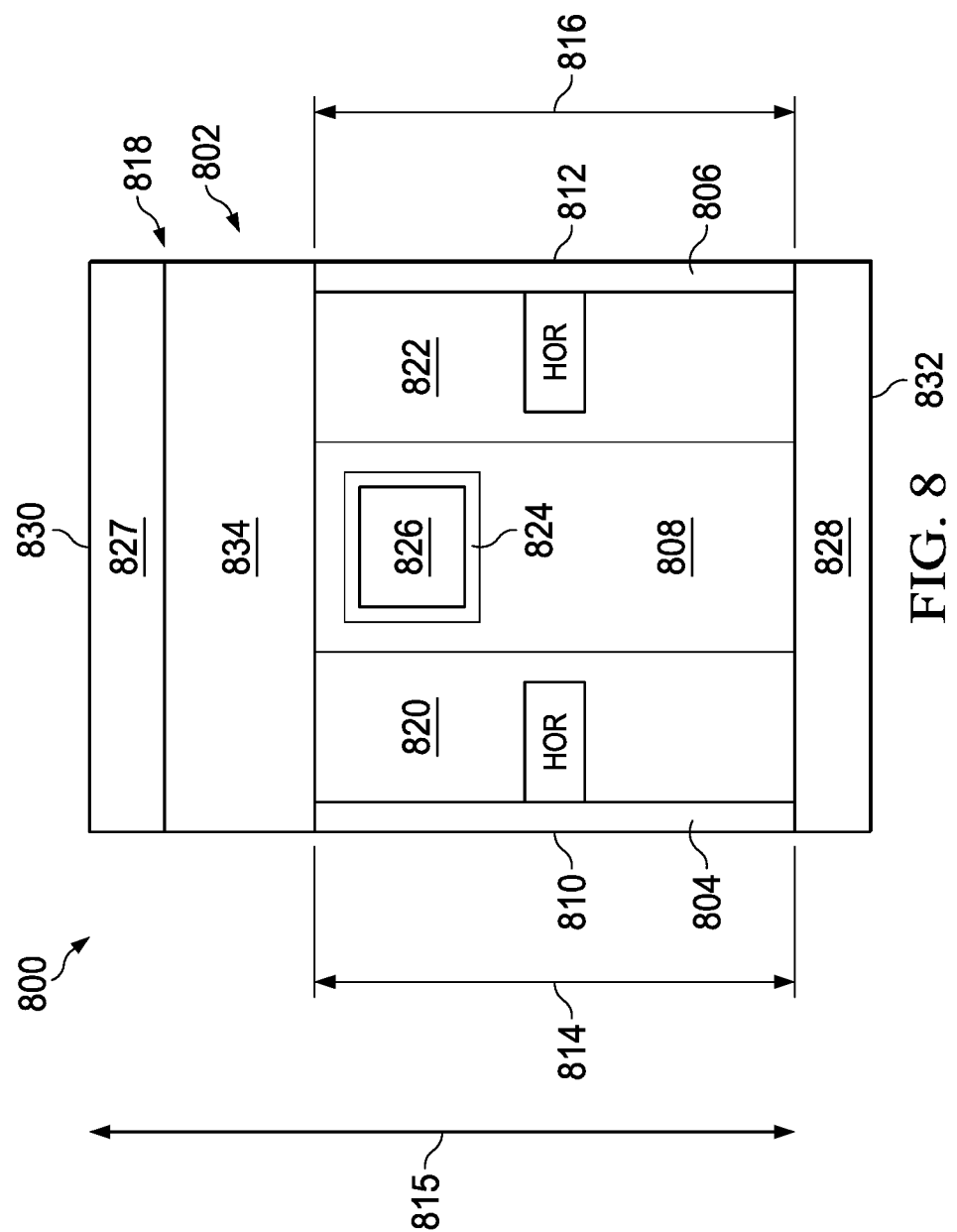
FIG. 8 is an illustration of a fourth layout for a core of a composite fan cowl in accordance with an illustrative embodiment.

Turning now to FIG. 8, an illustration of a fourth layout for a core of a composite fan cowl is depicted in accordance with an illustrative embodiment. Core 800 is an example of a layout of core 210 of composite fan cowl 208 of FIG. 2. Core 800 is an example of a layout of a core for one of composite fan cowl 302 or composite fan cowl 304 of FIG. 3. Core 800 is a layout for creating a physical core for a composite fan cowl. A physical core may be created based on the design of core 800.

Core 800 has plurality of zones 802, each having a respective thickness. Plurality of zones 802 includes first edge zone 804, second edge zone 806, and lower zone 808. First edge zone 804 is associated with a leading edge of a composite fan cowl, such as leading edge 314 of composite fan cowl 302 of FIG. 3. First edge zone 804 includes a portion of leading edge 810 of core 800.

Second edge zone 806 is associated with a trailing edge of the composite fan cowl, such as trailing edge 318 of composite fan cowl 302 of FIG. 3. Second edge zone 806 includes a portion of trailing edge 812 of core 800. As depicted, length 814 of the portion of leading edge 810 covered by first edge zone 804 in arc-direction 815 is substantially the same as length 816 of the portion of trailing edge 812 covered by second edge zone 806 in arc-direction 815. As depicted, length 714 of the portion of leading edge 710 covered by first edge zone 704 in arc-direction 711 in FIG. 7 is greater than both length 814 and length 816 of FIG. 8.

In some illustrative examples, first edge zone 804 and second edge zone 806 have the same thickness. In other illustrative examples, first edge zone 804 has a greater thickness than second edge zone 806.

Lower zone 808 is between first edge zone 804 and second edge zone 806, wherein a thickness of lower zone 808 is less than a thickness of each of first edge zone 804 and second edge zone 806.

Core 800 also has plurality of transitions 818. Each transition of plurality of transitions 818 is an area gradually reducing or increasing thickness between zones of different thicknesses. Not all of plurality of transitions 818 are explicitly identified on core 800. Each transition of plurality of transitions 818 occupies space between the respective zones of plurality of zones 802. Three transitions, transition 820, transition 822, and transition 824 are depicted in core 800.

Transition 820 is between first edge zone 804 and lower zone 808 and transition 822 is between second edge zone 806 and lower zone 808. As depicted, a hold open rod (HOR) is associated with transition 820 and a second hold open rod (HOR) is associated with transition 822. Similar to first transition 602 and second transition 604 shown in FIG. 6, transition 820 and transition 822 provide support and stiffening to areas connected to hold open rods (HOR).

Transition 824 includes edges of opening 826. Here, transition 824 may provide localized stiffening to core 800 around opening 826.

Plurality of zones 802 also includes hinge zone 827 and latch zone 828. Hinge zone 827 is on first end 830 of arc-direction 815. Latch zone 828 is on second end 832 of arc-direction 815. The hinges of the composite fan cowl are associated with hinge zone 827 of core 800. The latches of the composite fan cowl are associated with latch zone 828 of core 800.

Core 800 further comprises upper zone 834 having a greater thickness than lower zone 808. Upper zone 834 is above each of lower zone 808, first edge zone 804, and second edge zone 806, along an arc of the composite fan cowl.

Plurality of zones 802 may have any desirable respective thicknesses. In some illustrative examples, the thicknesses for hinge zone 827 and latch zone 828 are selected based on performance parameters. In some illustrative examples, the thicknesses for hinge zone 827 and latch zone 828 are unchanged from a conventional core design.

In some illustrative examples, the thicknesses for each of hinge zone 827 and latch zone 828 are greater than at least one of upper zone 834 or lower zone 808. In other illustrative examples, the thickness of upper zone 834 is greater than or equal to a thickness of at least one of hinge zone 827 or latch zone 828.

Although not depicted in FIG. 8, a power door open system (PDOS) may be associated with upper zone 834. In illustrative examples in which a power door open system (PDOS) is associated with upper zone 834, the thickness of upper zone 834 may be selected to provide support to the power door open system (PDOS). In illustrative examples in which a power door open system (PDOS) is associated with upper zone 834, the thickness of upper zone 834 may be selected to reduce deformation influenced by the position of power door open system (PDOS).

In some illustrative examples, the respective thicknesses for plurality of zones 802 are each within the range of half an inch to two and a half inches. In some illustrative examples, a greatest thickness for plurality of zones 802 is three inches. At least one of a minimum or a maximum thickness for plurality of zones 802 may be set based on manufacturing constraints.

The size and shape of each of plurality of zones 802 may be modified based on at least one of ease of manufacturing, space constraints within the composite fan cowl, or a change in estimated load for a topography model such as core 400 in FIG. 4.

The different components shown in FIGS. 1 and 3-8 may be combined with components in FIG. 2, used with components in FIG. 2, or a combination of the two. Additionally, some of the components in FIGS. 1 and 3-8 may be illustrative examples of how components shown in block form in FIG. 2 can be implemented as physical structures.

Figure 9:
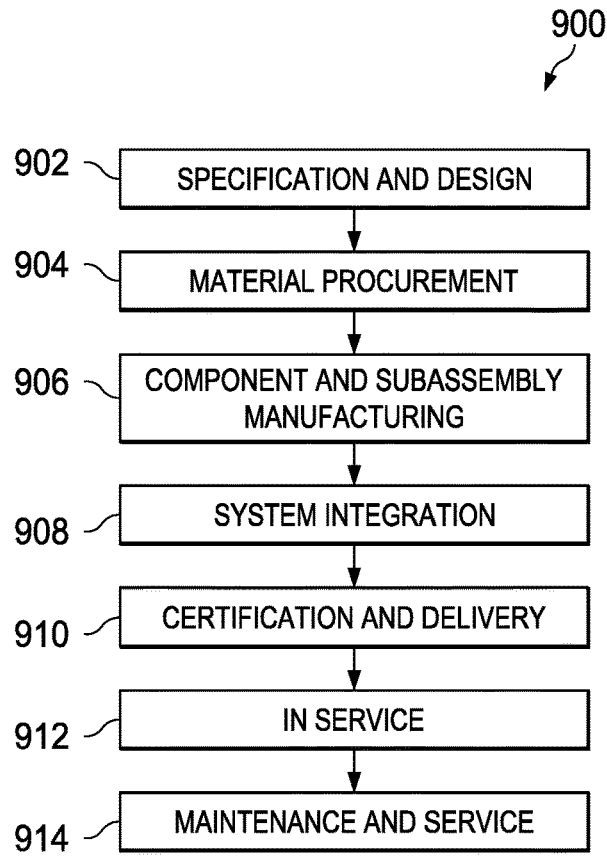
FIG. 9 is an illustration of an aircraft manufacturing and service method in the form of a block diagram in accordance with an illustrative embodiment.
Figure 10:
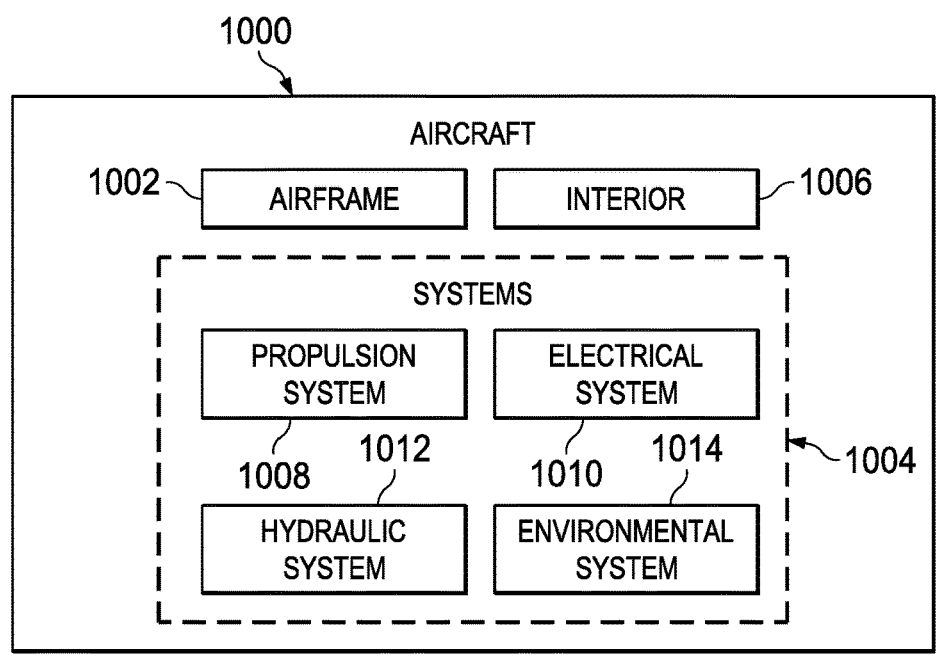
FIG. 10 is an illustration of an aircraft in the form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900. One or more illustrative embodiments may be used in aircraft 1000. One or more illustrative embodiments may be formed during component and subassembly manufacturing 906 of FIG. 9. For example, core 210 of composite fan cowl 208 of FIG. 2 may be formed during component and subassembly manufacturing 906. Further, core 210 of composite fan cowl 208 of FIG. 2 may be rotated open during maintenance and service 914 of FIG. 9. During maintenance and service 914 of FIG. 9, core 210 of composite fan cowl 208 may undergo deformation from a gust of wind.

The illustrative examples show a composite fan cowl having a core with varying thickness. The core may be designed based on topography optimization.

Topography optimization is a special class of shape optimization. In topography optimization, the nodes of final elements in a model are independently moved along a prescribed direction within some allowed bounds. In this disclosure, a novel approach is developed when topography optimization is employed on composite sandwich panel structures to determine its optimum core thickness.

The objective for the topography optimization may be to minimize the mass of the fan cowl panel. The design variables for the topography optimization may include core height and the nodes. The core height is a thickness of each individual node in the inside face of the composite sandwich in an FC model. The range has a desired limit. In some illustrative examples, the range is between zero and three inches. Each node is a design variable and are independent of each other. The hinge area may be excluded from thickness variation.

The topography optimization may be subject to loads from wind gust conditions (held by either hold open rod (HOR) or power door open system (PDOS); loads from extreme operating conditions (hinges and latches); and loads from steps and gaps circumstances (aerodynamics). The topography optimization may include constraints in displacements to match baseline displacements for the given load cases. Symmetry along the fore-aft direction of the fan cowl may be enforced. Symmetry between the left and right side door may be enforced.

Looking at a 1D beam simplification of the fan cowl, and looking at its shear and bending moment diagram, it can be seen that the core height is growing proportional to the bending moment. Thus, the optimizer may be trying to reduce bending deflection (main deflection mode) by increasing core thickness, which in turn increases moment of inertia, in the areas of maximum bending moment.

The number of plies of the composite play an important role in the design as well. The optimizer takes advantage of the existing stiffness in the laminate to make the structure more efficient, resulting in the strips at the leading and training edges near the edge bands.

Transitional areas (ramps) between zones may be dictated mostly by manufacturing requirements. Differences in the core between strips in leading and trailing edges help to lessen scooping issues, not explicitly included in the optimization.

Currently an airplane fan cowl is sized by deflection from a gust load. There is an opportunity to reduce weight. Conventional solutions can withstand the gust loads, but is rather bulky and heavy Based on topography optimization, a fan cowl concept was created. The optimization was set in such way that the fan cowl maintains the same level of deflection as the current design under gust loading while minimizing weight. The resultant concept may be between 20 and 40 pounds lighter per cowl than the current design. In one example, the concept is about 32 pounds lighter per cowl than the current design. This would be a 128 pounds weight savings per airplane. The concept may also improve the overall deflection.

The design works because it efficiently distributes material to areas where the bending moment is larger, while eliminating material where is not needed. Reducing the fan cowl weight will increase the performance of the airplane, and can potentially be cheaper since less material is needed.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite fan cowl comprising:
   laminate skins;
   a core with a plurality of zones having a plurality of core thicknesses, wherein the plurality of zones includes a hinge zone, a latch zone, and a zone between the hinge zone and the latch zone having a lower thickness than both of a thickness of the hinge zone and a thickness of the latch zone;
   a plurality of transitions between the plurality of core thicknesses, wherein the plurality of transitions comprises a plurality of ramp downs;
   two hold open rods, wherein the two hold open rods are associated with two transitions of the plurality of transitions; and
   wherein the zone between the hinge zone and the latch zone is a first zone, wherein a second zone of the plurality of zones is positioned between the two hold open rods, wherein a third zone of the plurality of zones is above the second zone in an arc-direction and the first zone of the plurality of zones is below the second zone in the arc-direction, and wherein a thickness of the second zone is greater than respective thicknesses of the third zone and the first zone.

2. The composite fan cowl of claim 1, wherein an area of the core outside of the hinge zone and the latch zone has a plurality of core thicknesses from a leading edge of the composite fan cowl to a trailing edge of the composite fan cowl.

3. The composite fan cowl of claim 1, wherein the plurality of core thicknesses is in a range of 0.5 inches to 2.5 inches.

4. The composite fan cowl of claim 1, wherein the plurality of zones includes edge zones associated with a leading edge of the core of the composite fan cowl and a trailing edge of the core of the composite fan cowl.

5. The composite fan cowl of claim 4, wherein the edge zones have greater respective core thicknesses than the zone between the hinge zone and the latch zone.

6. The composite fan cowl of claim 4, wherein the zone between the latch zone and the hinge zone is a lower zone, wherein the plurality of zones further comprises an upper zone between the edge zones, the hinge zone, and the lower zone, and wherein the upper zone and the lower zone have different respective core thicknesses.

7. The composite fan cowl of claim 1, wherein a number of plies of each of the laminate skins is independent of the plurality of core thicknesses of the core.

8. The composite fan cowl of claim 1, wherein the plurality of core thicknesses is selected based on a bending moment of the composite fan cowl when subjected to wind gusts when the composite fan cowl is in an open position.

9. The composite fan cowl of claim 1, wherein the core is a honeycomb core.

10. A composite fan cowl comprising:
    a core with a plurality of zones each having a respective thickness, wherein the plurality of zones includes a first edge zone associated with a leading edge of the core, a second edge zone associated with a trailing edge of the core, and a lower zone between the first edge zone and the second edge zone, wherein a thickness of the lower zone is less than a thickness of each of the first edge zone and the second edge zone;
    a first transition between the first edge zone and the lower zone, wherein the first transition is a ramp down greater than 35 degrees;
    a second transition between the second edge zone and the lower zone, wherein the second transition is a ramp down greater than 35 degrees; and
    wherein a hold open rod is associated with the first transition and a second hold open rod is associated with the second transition.

11. The composite fan cowl of claim 10, wherein the core further comprises an upper zone having a greater thickness than the lower zone, wherein the upper zone is above the lower zone along an arc of the composite fan cowl.

12. The composite fan cowl of claim 11, wherein a power door open system is associated with the upper zone.

13. An engine nacelle comprising:
    an inlet;
    an exhaust end;
    a composite fan cowl having a core;
    a leading edge of the core associated with the inlet and a trailing edge of the core associated with the exhaust end, wherein the leading edge and the trailing edge each have a greater thickness than a lower zone between the leading edge and the trailing edge;
    a first transition ramping down from the leading edge to the lower zone and a second transition ramping up from the lower zone to the trailing edge; and a hold open rod associated with the first transition or the second transition.

14. The engine nacelle of claim 13, further comprising a second hold open rod associated with the other of the first transition or the second transition.

15. The engine nacelle of claim 13, wherein the core further comprises:
a plurality of zones having a plurality of core thicknesses, wherein the plurality of zones includes a hinge zone, a latch zone, and the lower zone between the hinge zone and the latch zone, wherein the lower zone has a lower thickness than both of a thickness of the hinge zone and a thickness of the latch zone.

16. The engine nacelle of claim 15, wherein an area of the core outside of the hinge zone and the latch zone has a plurality of core thicknesses from the leading edge to the trailing edge.

17. The engine nacelle of claim 15, wherein the plurality of zones includes edge zones associated with the leading edge and the trailing edge.

18. The engine nacelle of claim 17, wherein the plurality of zones further comprises an upper zone between the edge zones, the hinge zone, and the lower zone, and wherein the upper zone and the lower zone have different respective core thicknesses.

19. The engine nacelle of claim 18, wherein a power door open system is associated with the upper zone.

20. The engine nacelle of claim 13, wherein the core is a honeycomb core.

\* \* \* \* \*